United States Patent [19]

Stapp et al.

[11] Patent Number: 4,493,370
[45] Date of Patent: Jan. 15, 1985

[54] UREA AS A COSURFACTANT IN ENHANCED OIL RECOVERY PROCESSES

[75] Inventors: Paul R. Stapp; Mary B. Chaney, both of Bartlesville, Okla.

[73] Assignee: Phillips Petroleum Company, Bartlesville, Okla.

[21] Appl. No.: 461,320

[22] Filed: Jan. 27, 1983

[51] Int. Cl.³ .............................................. E21B 43/22
[52] U.S. Cl. ..................... 166/273; 166/274; 252/8.55 D
[58] Field of Search ..................... 252/8.55 D, 8.55 R, 252/363.5, DIG. 14; 166/273, 274, 275

[56] References Cited

U.S. PATENT DOCUMENTS

| | | | |
|---|---|---|---|
| 2,356,205 | 8/1944 | Blair et al. | 252/8.55 |
| 3,508,611 | 4/1970 | Davis et al. | 166/275 X |
| 3,811,504 | 5/1974 | Flournoy et al. | 252/8.55 X |
| 3,811,505 | 5/1974 | Flournoy et al. | |
| 3,812,042 | 5/1974 | Verdier | 252/90 |
| 3,929,680 | 12/1975 | Aria et al. | 252/363.5 X |
| 3,964,548 | 6/1976 | Schroeder et al. | 166/273 |
| 4,013,125 | 3/1977 | Plummer et al. | 166/275 X |
| 4,043,922 | 8/1977 | Palmer et al. | |
| 4,079,785 | 3/1978 | Hessert et al. | 166/273 |
| 4,110,229 | 8/1978 | Carlin et al. | 252/8.55 |

Primary Examiner—Herbert B. Guynn

[57] ABSTRACT

A surfactant system useful for oil recovery comprising salt water, a surfactant, such as a petroleum sulfonate, and urea. Optionally, a $C_3$ to $C_8$ alcohol is additionally present as a cosurfactant.

13 Claims, No Drawings

UREA AS A COSURFACTANT IN ENHANCED OIL RECOVERY PROCESSES

This invention relates to surfactant systems. More specifically, this invention relates to the use of new surfactant systems for oil recovery.

Waterflooding and surfactantflooding are processes well known in the art to recover vast quantities of oil which remain in the formation after primary oil recovery. In the case of surfactantflooding, it is not common to employ a cosurfactant wherein the latter aids in forming a microemulsion with the oil to be recovered.

The oil recovery effectiveness of surfactant systems can be diminished by the presence of a highly saline environment (i.e., greater than two weight percent total dissolved solids) present in the region of the oil to be recovered. This is because high salinity waters can cause precipitation of surfactants and hence destroy their effectiveness in the oil recovery process. A highly saline environment can also diminish the effectiveness of mobility buffers by reducing their viscosity. Therefore, it is highly desirable to develop surfactant systems which are effective in highly saline environments.

It is therefore an object of this invention to provide surfactant systems consisting essentially of a surfactant and cosurfactant which are effective for tertiary oil recovery even in highly saline environments. A further object of this invention is to provide a surfactantflooding process which enhances tertiary oil recovery.

These and other objects, advantages, details, features and embodiments of this invention will become apparent to those skilled in the art from the following detailed description of the invention and the appended claims.

In accordance with this invention, it has been found that urea can be efficiently used as a cosurfactant with a hydrocarbon sulfonate surfactant in surfactantflooding operations for oil recovery.

Thus, in accordance with a first embodiment of this invention, there is provided a new surfactant system comprising salt water, a hydrocarbon sulfonate surfactant, and urea as a cosurfactant.

SURFACTANT SYSTEM

The surfactant system of this invention is an aqueous system containing a certain quantity of sodium chloride. Typical and preferred compositions of a surfactant system of this invention are shown in the following table:

TABLE I

| Ingredient | Broad Range | Preferred Range |
|---|---|---|
| Water (parts by wt.) | 100 | 100 |
| Hydrocarbon Sulfonate* (active parts by wt.) | 0.1–15 | 1–12 |
| Urea (parts by wt.) | 0.05–15 | 1–7 |
| Alcohol (parts by wt.) | 0–15 | 0.05–5 |
| Protective Agent (parts by wt.) | 0.01–3 | 0.05–2 |
| NaCl (parts by wt.) | 0.1–10 | 0.1–8 |

*The ranges for the active hydrocarbon sulfonate (e.g., petroleum sulfonate) in parts by weight. The "active" value is readily determined by multiplying parts by weight used and the fraction of active ingredients in the product.

SURFACTANT

The surfactant used in the surfactant system of this invention is a hydrocarbon sulfonate surfactant having an equivalent weight of from about 225 to about 600. Examples of hydrocarbon sulfonates include petroleum sulfonates, olefin sulfonates and alkane sulfonates. The preferred surfactant is a petroleum sulfonate. The presently preferred surfactants used in oil recovery are petroleum sulfonates having an average equivalent weight in the range of 325 to 600. Best results with presently known reservoirs are believed to be obtainable with petroleum sulfonates having average equivalent weights of about 325 to 500.

COSURFACTANTS

In accordance with this invention urea is used as a cosurfactant. Urea is represented by the following formula:

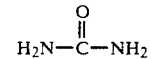

The use of urea as a cosurfactant is particularly advantageous since urea is highly soluble in aqueous systems.

In a preferred embodiment, $C_3$ to $C_8$ alcohols are present as cosurfactants along with urea.

Representative examples of alcohols suitable for use in the present invention include isobutyl alcohol, isopropyl alcohol, t-butyl alcohol, isoamyl alcohol, octyl alcohols, hexyl alcohols, and mixtures thereof.

Isobutyl alcohol is the currently preferred alcohol for use as a cosurfactant in admixture with urea. Generally, the alcohol should have a brine solubility of 0.01 to 20, preferably 0.1–5 grams per 100 grams of brine.

PROTECTIVE AGENT

Protective agents are an especially preferred ingredient in the surfactant system of this invention when used for oil recovery from reservoirs with hard brines. They aid in solubilizing the surfactant in a high salinity environment. Examples for such protecting agents are polyethoxylated fatty alcohols, polyethoxylated alkylphenols and the sodium salts of sulfated polyethoxylated fatty alcohols and polyethoxylated alkylphenols.

OIL RECOVERY PROCESS

An oil recovery process using the surfactant system of this invention as defined above constitutes another embodiment of this invention. This process involves generally the conventional steps of post primary oil recovery and distinguishes over the known procedures primarily in the use of urea as a cosurfactant.

PREFLUSH

It is optional, although not necessary, to carry out a preflush step preceding the post primary oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

SURFACTANTFLOODING

After the optional preflush step the surfactant system of this invention is injected into the reservoir via at least one injection well in an amount usually in the range of about 0.001 to 1.0, preferably 0.01 to 0.25 pore volume based on the pore volume of the total treated and produced formation.

The preferred operation makes use of the aqueous saline surfactant system in the form of a single phase. Usually the surfactant system contains salt water, surfactant and the urea cosurfactant as the principal ingredients. The single phase surfactant system is introduced into the formation via one or more injection wells and the generation of a microemulsion takes place in-situ as the injected surfactant system contacts the oil in place. It is contemplated that surfactant systems characterized by the presence of more than one phase are preferably subjected to continuous mixing during the injection operation.

The present invention can be utilized for a variety of subterranean reservoirs. The invention is, however, particularly preferred in reservoirs containing hard brine connate water. Such hard brines are characterized by a high content of $Mg^{++}$ and $Ca^{++}$ ions in the reservoir water. Typical hard brines contain more than 100 ppm of $Ca^{++}$ and/or $Mg^{++}$.

MOBILITY BUFFER

Following the surfactant slug it is presently preferred, although again not necessary, to inject a mobility buffer solution into the reservoir. This buffer helps prevent fingering and enhances the efficiency of the oil recovery. Mobility buffer solutions are aqueous solutions of thickening agents. Examples of useful mobility buffers are aqueous and nonaqueous fluids containing mobility reducing agents such as high molecular weight partially hydrolyzed polyacrylamides, biopolysaccharides, cellulose ethers and the like. The mobility buffer comprises 50 to 20,000, preferably 200 to 5,000 ppm of the mobility reducing agent in the fluid.

The injection of the mobility buffer fluid can be at a constant composition or the mobility buffer can be graded, i.e., the injection starts out at a relatively high concentration at the leading edge and the concentration tapers off toward the trailing edge. As an example the mobility buffer can start with a concentration of 2500 ppm of polyacrylamide in the water and end with 250 ppm of polyacrylamide in water. These mobility buffer fluids are well known in the art.

The invention will be still more fully understood from the following detailed examples which are intended for illustrative purposes only and not for an undue limitation of the scope of this invention.

The following Examples further illustrate the present invention.

EXAMPLE I

Core Preparation

The following conditioning procedure was used in preparing the waterwet Berea sandstone cores for surfactantflooding. Berea sandstone cores measuring approximately 3 feet in length and 3 inches in diameter were dried under vacuum for 24 hours at 250° F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine was pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine Saturated Core Wt (g)} - \text{Dry Core Wt (g)}}{\text{Brine Density (g/mL)}} =$$

Core Pore Volume (mL)

The brine saturated core was oilflooded in the conventional manner until oil break-through became detectable by the presence of alternate globules of oil and water in the effluent line. The oilflood was carried out to completion by the 24 hour recycling of oil through the core to remove all of the displaceable water. The total water displaced, i.e., water displaced at the point of oil break-through and water displaced by the 24 hour recycle procedure was recorded as water displaced by oilflood. If desired, oil permeability was determined in a manner analogous to that used above for establishing original permeability to water. Prior to waterflood, the effluent line was air blown to remove oil.

The oilflooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE II

This example demonstrates the effectiveness of a petroleum sulfonate/urea surfactant system in recovering waterflood residual oil from a waterwet Berea sandstone core. The surfactantflooding was carried out in the conventional manner of sequentially injecting the petroleum sulfonate/urea slug and a thickened aqueous mobility buffer slug of polyacrylamide graded back logarithmically with Arkansas-Burbank water.

The surfactant slug had the following compostion:

| 8.71 g | Witco 10-410 (62 wt % active petroleum sulfonate) |
| 4.50 g | Urea (cosurfactant) |
| 4.05 g | NaCl |
| 132.74 g | Arkansas-Burbank water |
| 150 g | Total Composition |

Thus, each component was present in the following weight percentages:

| Petroleum sulfonate (active basis) | 3.6 wt % |
| Urea | 3.0 wt % |
| Sodium chloride | 2.7 wt % |
| Arkansas-Burbank water | 90.7 wt % |

The pore volume of the 3"×3' cylindrical Berea sandstone core was 776 mL. Since a 58.2 mL slug of the above surfactant composition was injected, the slug size expressed in terms of core pore volume was 7.5% PV. The surfactant slug was followed by 388 mL (0.5 PV) of Betz Hi Vis polyacrylamide (1700 ppm) in Arkansas-Burbank water graded back logarithmically with Arkansas-Burbank water. Arkansas-Burbank water is essentially fresh water containing less than about 350 ppm total dissolved solids.

In preparing the core, 540.6 mL of water was displaced from the water-saturated core by oilflood indicating the introduction of approximately 540.6 mL of oil into the core. Subsequent waterflood resulted in approximately 250 mL of oil being displaced from the core leaving approximately 290.6 mL of waterflood residual oil in the Berea sandstone core pore prior to the surfactantflood.

In the course of the surfactantflood, a total effluent of 2.25 pore volumes (ca. 1750 mL) was collected which contained 248 mL of tertiary oil representing 85.3% of the waterflood residual oil.

EXAMPLE III

This example demonstrates the effectiveness of a petroleum sulfonate/urea surfactant system in recovering waterflood residual oil from waterwet Berea sandstone cores. The surfactantflooding was carried out in essentially the same manner as described in Example II.

The surfactant slug had the following composition:
8.71 g Witco 10-410 (62 wt % active petroleum sulfonate)
4.50 g Urea (cosurfactant)
4.95 g NaCl
131.84 g Arkansas-Burbank water.

Thus, each component was present in the following weight percentages:

| Petroleum sulfonate (active basis) | 3.6 wt % |
| Urea | 3.0 wt % |
| Sodium chloride | 3.3 wt % |
| Arkansas-Burbank water | 90.1 wt % |

The core volume of the 3"×3' cylindrical Berea sandstone core was 831 mL. Since a 66.5 mL slug of the above surfactant composition was injected, the slug size expressed in terms of core pore volume was 8% PV. The surfactant slug was followed by 415.5 mL (0.5 PV) of Betz Hi Vis polyacrylamide (ca. 1750 ppm) in Arkansas-Burbank water graded back logarithmically with Arkansas-Burbank water.

In preparing the core, 590.3 mL of water was displaced from the water-saturated core by oilflood indicating the introduction of approximately 590.3 mL of oil into the core. Subsequent waterflood resulted in approximately 277.2 mL of oil being displaced from the core leaving approximately 313.1 mL of waterflood residual oil in the Berea sandstone core prior to the surfactantflood.

In the course of the surfactantflood, a total effluent of 2.08 pore volumes (ca. 1730 mL) was collected which contained 279.6 mL of tertiary oil representing 89.3% of the waterflood residual oil, thereby reflecting the high effectiveness of the inventive surfactant system in tertiary oil recovery.

Reasonable variations and modifications which will become apparent to those skilled in the art can be made in this invention without departing from the spirit and scope thereof.

I claim:

1. A surfactant composition consisting essentially of:
   (a) water;
   (b) sodium chloride;
   (c) a petroleum sulfonate surfactant having an equivalent weight of from about 225 to about 600; and
   (d) urea;
wherein said water is present in an amount of 100 parts by weight; said sodium chloride is present in an amount from 0.1–10 parts by weight, said petroleum sulfonate surfactant is present in an amount from 0.1–15 parts by weight, and said urea is present in an amount from 0.05–15 parts by weight.

2. An aqueous composition according to claim 1 wherein said sodium chloride is present in an amount from 0.1–8 parts by weight, said petroleum sulfonate surfactant is present in an amount from 1–12 parts by weight and said urea is present in an amount from 1–7 parts by weight.

3. A composition according to claim 1 further containing up to 15 parts by weight of at least one $C_3$ to $C_8$ alcohol.

4. A composition according to claim 3 wherein said $C_3$ to $C_8$ alcohol is present in an amount from 0.05–5 parts by weight.

5. A composition according to claim 4 wherein said alcohol is isobutyl alcohol.

6. A composition according to claim 1 wherein said surfactant is a petroleum sulfonate having an equivalent weight from 325 to 600.

7. A composition according to claim 1 wherein said petroleum sulfonate has an equivalent weight from 325 to 500.

8. A composition according to claim 7 wherein there is additionally present at least one protective agent selected from the group consisting of polyethoxylated fatty alcohols, polyethoxylated alkylphenols, a sodium salt of a sulfated polyethoxylated alkylphenol, and a sodium salt of a sulfated polyethoxylated fatty alcohol.

9. A process for hydrocarbon recovery from a subterranean formation comprising:
   (a) injecting a surfactant system consisting essentially of water, sodium chloride, a petroleum sulfonate surfactant having an equivalent weight from about 225 to about 600, and urea, into said formation via at least one injection well;

(b) thereby causing the so-injected surfactant system to move from the injection well toward the producing well thereby displacing the hydrocarbon present in the formation; and wherein said sodium chloride is present in an amount from 0.1-10 parts by weight, said petroleum sulfonate surfactant is present in an amount of from about 0.1 to about 15 parts by weight and said urea is present in an amount from about 0.05-15 parts by weight.

10. A process in accordance with claim 9 wherein a mobility buffer fluid is injected into said subterranean formation following the surfactant system.

11. A process in accordance with claim 10 wherein an aqueous drive fluid is injected into said subterranean formation following said mobility buffer flud.

12. A process in accordance with claim 11 wherein said surfactant system further contains at least one protective agent selected from the group consisting of polyethoxylated fatty alcohols, polyethoxylated alkylphoenols, a sodium salt of a sulfated polyethoxylated alkylphenol, and a sodium salt of a sulfated polyethoxylated fatty alcohol and is injected into a subterranean formation containing hard brine.

13. A process in accordance with claim 12 wherein said surfactant system contains urea and isobutyl alcohol.

* * * * *